(12) United States Patent
O'Hara et al.

(10) Patent No.: US 10,703,239 B2
(45) Date of Patent: Jul. 7, 2020

(54) SEAT ASSEMBLY INCLUDING A MODULAR FOAM ARRANGEMENT AND METHOD FOR FABRICATING THE SAME

(71) Applicant: Gulfstream Aerospace Corporation, Savannah, GA (US)

(72) Inventors: Timothy O'Hara, Savannah, GA (US); Richard Davies, Savannah, GA (US); Jeramiah Mallette, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 15/810,478

(22) Filed: Nov. 13, 2017

(65) Prior Publication Data

US 2019/0143863 A1    May 16, 2019

(51) Int. Cl.
| | |
|---|---|
| *A47C 1/032* | (2006.01) |
| *A47C 7/18* | (2006.01) |
| *B60N 2/64* | (2006.01) |
| *B60N 2/70* | (2006.01) |
| *B64D 11/06* | (2006.01) |
| *B60N 2/68* | (2006.01) |

(52) U.S. Cl.
CPC .......... *B60N 2/646* (2013.01); *A47C 1/03288* (2013.01); *A47C 7/18* (2013.01); *B60N 2/70* (2013.01); *B60N 2/7017* (2013.01); *B64D 11/0647* (2014.12); *B60N 2/68* (2013.01)

(58) Field of Classification Search
CPC .............................. A47C 1/03288; A47C 7/18
See application file for complete search history.

(56) References Cited

U.S. PATENT DOCUMENTS

| 4,726,086 A | 2/1988 | McEvoy | |
|---|---|---|---|
| 2005/0099052 A1* | 5/2005 | Bertolini | A47C 3/04 297/440.1 |
| 2005/0193497 A1* | 9/2005 | Baker | A47C 27/001 5/721 |
| 2011/0095581 A1* | 4/2011 | Pierce | A47C 1/16 297/219.1 |
| 2014/0259429 A1* | 9/2014 | Clayton | A47C 27/15 5/691 |
| 2015/0289659 A1* | 10/2015 | Tao | C09D 5/18 428/137 |
| 2016/0107752 A1* | 4/2016 | Palmer | B64D 11/0647 267/143 |

(Continued)

FOREIGN PATENT DOCUMENTS

| CA | 2841871 A1 * | 1/2013 | ........... A47C 27/144 |
|---|---|---|---|
| DE | 2033546 A1 * | 1/1971 | ............... A47C 7/18 |

(Continued)

*Primary Examiner* — Timothy J Brindley
(74) *Attorney, Agent, or Firm* — LKGlobal | Lorenz & Kopf, LLP

(57) ABSTRACT

Seat assemblies and methods for fabricating seat assemblies are provided. In one example, a seat assembly includes a seat frame and a seat cushion that is supported by the seat frame. The seat cushion includes a modular foam arrangement including a first modular foam section having a first interlocking feature and a second modular foam section having a second interlocking feature engaged with the first interlocking feature. An outer covering at least partially covers the modular foam arrangement.

20 Claims, 4 Drawing Sheets

(56) References Cited

U.S. PATENT DOCUMENTS

2017/0156506 A1* 6/2017 Torbet .................. A47C 27/142
2017/0325596 A1* 11/2017 Torbet .................. A47C 27/144

FOREIGN PATENT DOCUMENTS

| DE | 102010000960 B4 | 7/2013 | |
|---|---|---|---|
| WO | WO-2006102751 A1 * | 10/2006 | ............... A47C 7/18 |
| WO | WO-2014186866 A1 * | 11/2014 | ............. B29C 44/04 |
| WO | WO-2016002049 A1 * | 1/2016 | ......... A44B 18/0049 |
| WO | WO-2016147913 A1 * | 9/2016 | ............... B60N 2/90 |

* cited by examiner

SEAT ASSEMBLY INCLUDING A MODULAR FOAM ARRANGEMENT AND METHOD FOR FABRICATING THE SAME

TECHNICAL FIELD

The technical field relates generally to seat assemblies, and more particularly, relates to seat assemblies including a seat cushion with a modular foam arrangement and methods for fabricating such seat assemblies.

BACKGROUND

The commercial and/or military transportation industries, e.g., aircraft industry, motor vehicle industry, and the like, often include seat assemblies in the aircraft or motor vehicle for comfortably transporting an occupant(s). The seat assemblies include, for example, a seat frame that supports a plurality of seat cushions, such as a seat base cushion and a seat backrest cushion, for providing comfortable seating for an occupant.

The seat cushions are typically formed from one or more pieces of foam that are hand cut to shape. For example, the seat base cushion can be formed from a single piece of foam that may be subsequently trimmed as needed. Unfortunately, utilizing a single piece of foam to form the seat cushion can make customizing portions of the foam having different properties and/or configurations difficult or impossible.

In another example, the seat base cushion may be formed from multiple hand cut pieces of foam that are glued or bonded together with an adhesive. Unfortunately, the adhesive can produce patchy or random areas of hardness in the foam that can be uncomfortable for the seat occupant. Further, the adhesive can retard heat transfer throughout the foam causing the seat cushion to become uncomfortably warm for the seat occupant.

Accordingly, it is desirable to provide improved seat assemblies including a seat cushion that overcomes one or more of the foregoing concerns. Furthermore, other desirable features and characteristics of the various embodiments described herein will become apparent from the subsequent detailed description and the appended claims, taken in conjunction with the accompanying drawings and this background.

SUMMARY

Seat assemblies and methods for fabricating seat assemblies are provided herein. In accordance with an exemplary embodiment, a seat assembly includes a seat frame and a seat cushion that is supported by the seat frame. The seat cushion includes a modular foam arrangement including a first modular foam section having a first interlocking feature and a second modular foam section having a second interlocking feature engaged with the first interlocking feature. An outer covering at least partially covers the modular foam arrangement.

In another exemplary embodiment, a seat assembly includes a seat base portion including a seat base structure portion and a seat base cushion supported by the seat base structure portion. The seat base cushion includes a modular foam arrangement including a first modular foam section having a first interlocking feature and a second modular foam section having a second interlocking feature engaged with the first interlocking feature. An outer covering at least partially covers the modular foam arrangement. A seat backrest portion is coupled to the seat base portion and is configured to extend substantially upright from a rearward section of the seat base portion. The first modular foam section overlies the second modular foam section and extends generally forward of the seat backrest portion.

In accordance with an exemplary embodiment, a method for fabricating a seat assembly is provided. The method includes engaging a first interlocking feature of a first modular foam section with a second interlocking feature of a second modular foam section for forming a modular foam arrangement. The modular foam arrangement is at least partially covered with an outer covering for forming a seat cushion. The seat cushion is supported by a seat frame.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to seat assemblies and methods for fabricating seat assemblies. The exemplary embodiments taught herein provide a seat assembly including a seat frame and one or more seat cushions, such as a seat base cushion and/or a seat backrest cushion, supported by the seat frame. The seat cushion includes a modular foam arrangement that includes a plurality of modular foam sections. The modular foam sections include at least a first modular foam section that has a first interlocking feature and a second modular foam section that has a second interlocking feature that engages with the first interlocking feature to couple the first and second modular foam sections together. An outer covering at least partially covers the modular foam arrangement.

In an exemplary embodiment, it has been found that by forming the seat cushion using a plurality of modular foam sections, the modular foam sections can each be configured independently, such as having different properties and/or configurations. For example, one of more of the modular foam sections can have a different foam density than the other modular foam sections for varying the softness or hardness of different portions of the modular foam arrangement. As such, the seat cushion can be correspondingly configured to have customized portions that correspond to the different properties and/or configurations of the modular foam sections. Further, by forming the seat cushion including modular foam sections that are coupled together using interlocking features that engage with each other, the use of adhesive to couple the different modular foam sections together can be reduced or eliminated to produce a more comfortable seat cushion for a seat occupant.

Figure 1:
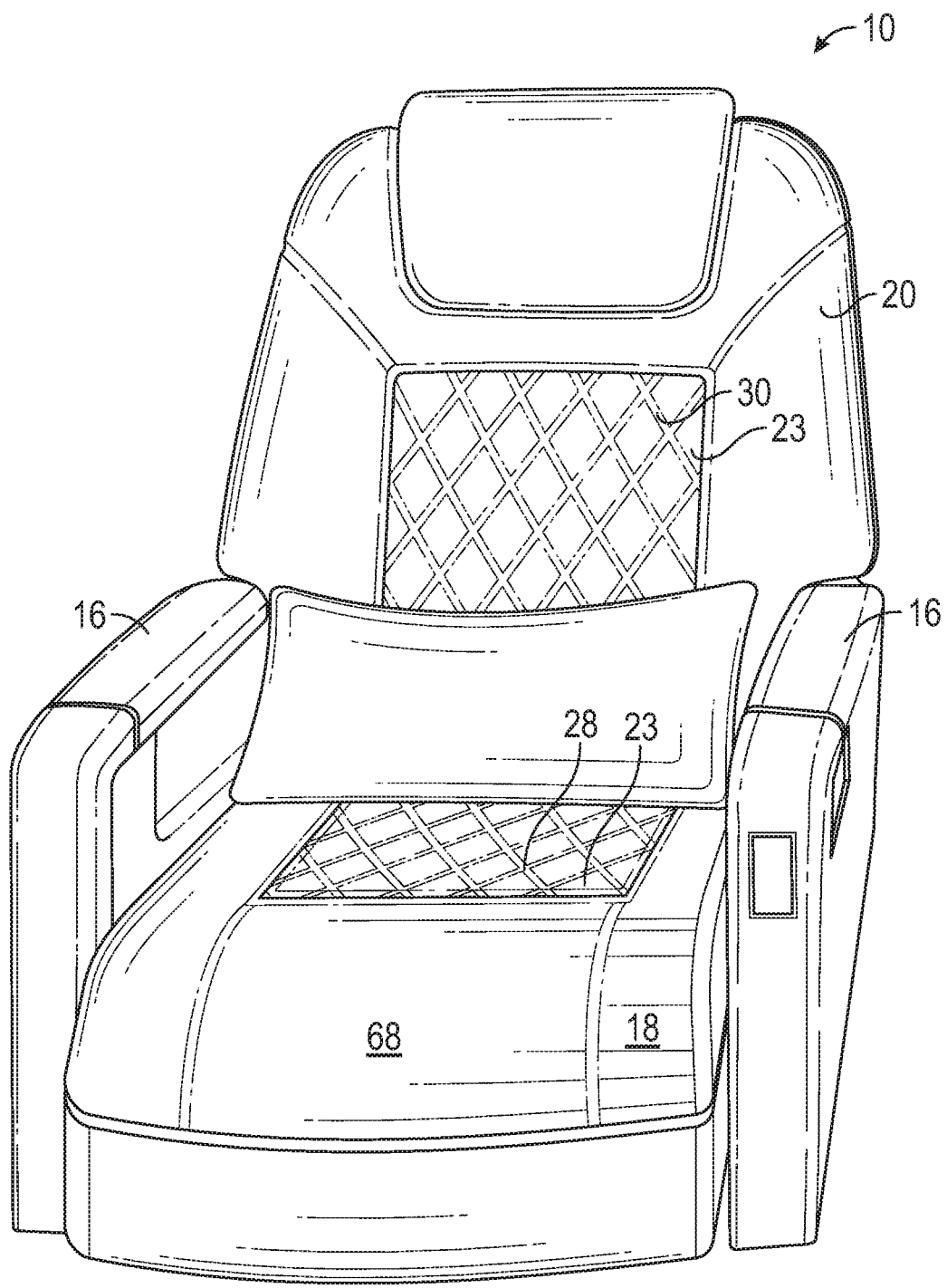
FIG. 1 illustrates a perspective view of a seat assembly in accordance with an exemplary embodiment.
Figure 2:
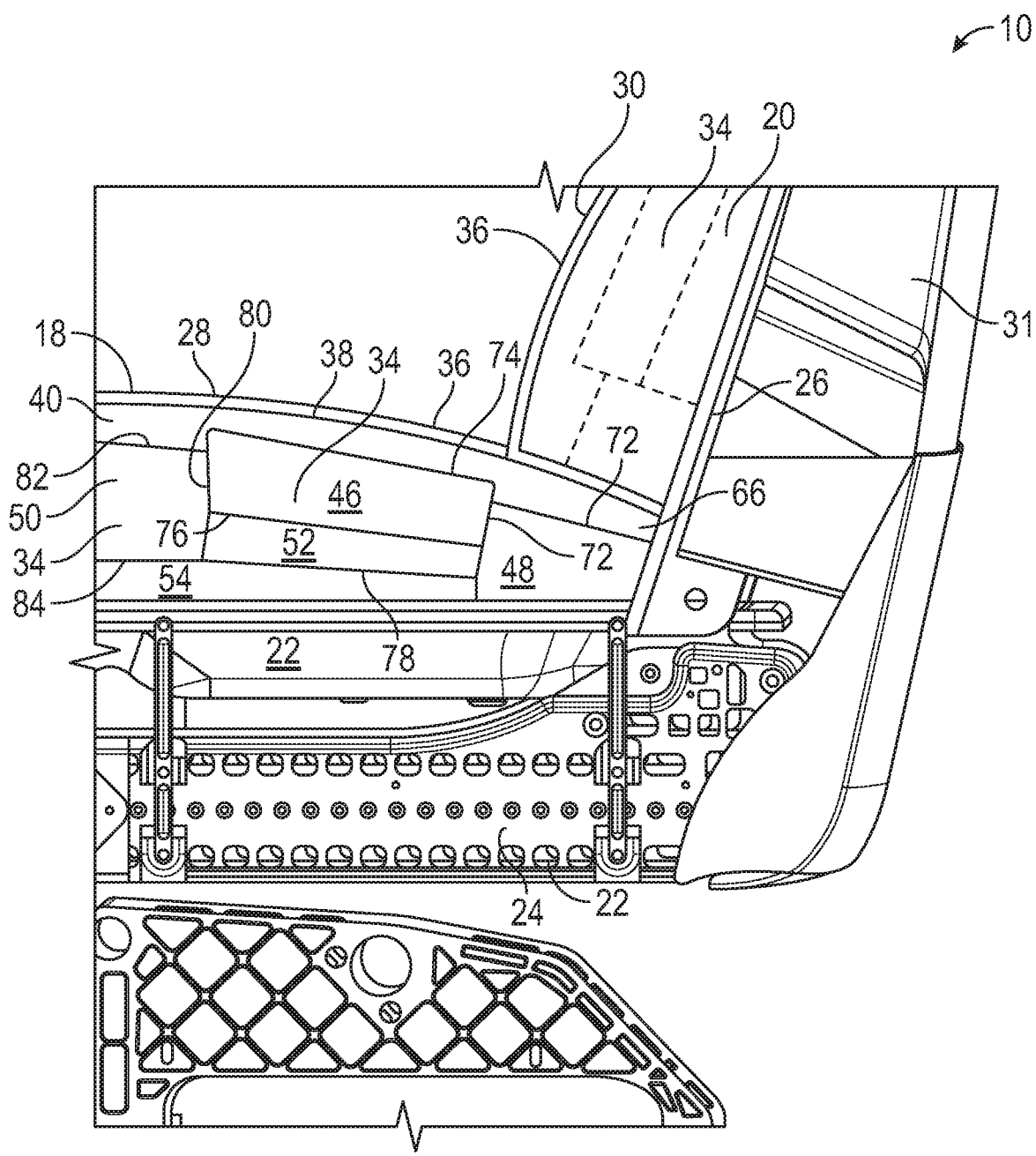
FIG. 2 illustrates a side view of a portion of a seat assembly with a seat frame, a seat base cushion, and a seat backrest cushion in accordance with an exemplary embodiment.
Figure 3:
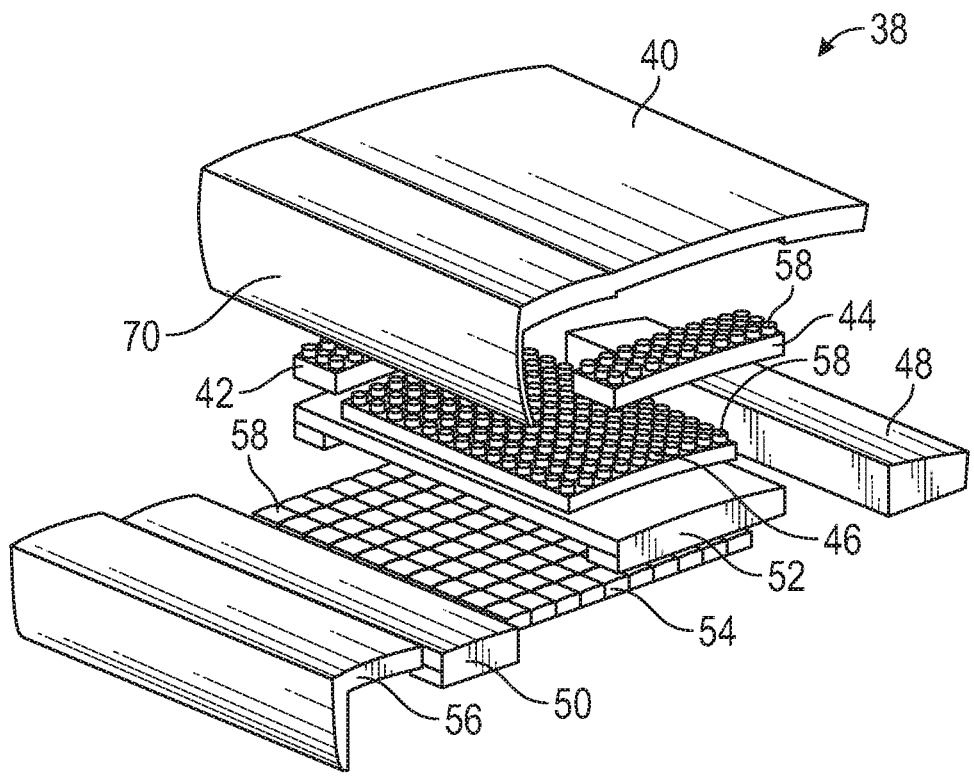
FIG. 3 illustrates an exploded perspective view from above of a modular foam arrangement of a seat cushion in accordance with an exemplary embodiment.
Figure 4:
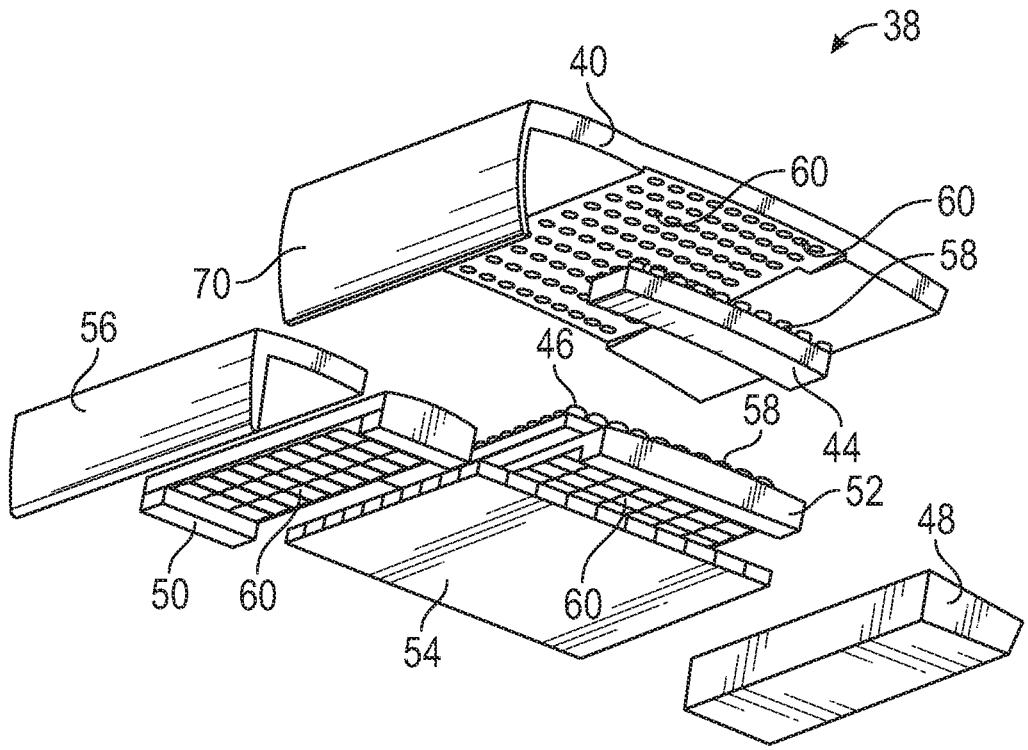
FIG. 4 illustrates an exploded perspective view from below of a modular foam arrangement of a seat cushion in accordance with an exemplary embodiment.

FIG. 1 illustrates a perspective view of a seat assembly 10 in accordance with an exemplary embodiment. FIG. 2 is a side view of a portion of the seat assembly 10 depicted in FIG. 1. Referring to FIGS. 1-2, the seat assembly 10 has a seat base portion 18 and a seat backrest portion 20 that extends substantially upright from the seat base portion 18. In one example, the seat backrest portion 20 is fixedly coupled to the seat base portion 18 such that the seat backrest portion 20 is permanently set in a substantially upright configuration. In another example, the seat assembly 10 is an adjustable seat assembly in which the seat backrest portion 20 is pivotably coupled to the seat base portion 18 for movement between a substantially upright position and, for example, a substantially reclined and/or inclined (e.g., forward leaning) position(s).

As illustrated, the seat assembly 10 includes a seat frame 22 for supporting the seat assembly 10 including supporting armrest portions 16 and a plurality of seat cushions 23. The seat frame 22 is formed of a relatively rigid support material such as metal, e.g., aluminum or the like, composite, or any other frame structure material(s) known to those skilled in the art.

The seat frame 22 includes a seat base structure portion 24 and a seat backrest structure portion 26 that is operatively coupled (e.g., fixedly coupled or pivotably coupled) to the seat base structure portion 24 to extend in a substantially upright position from the seat base structure portion 24. The seat base structure portion 24 of the seat frame 22 supports a seat base cushion 28 (e.g., one of the seat cushions 23) that together form at least part of the seat base portion 18 of the seat assembly 10. Likewise, the seat backrest structure portion 26 of the seat frame 22 supports a seat backrest cushion 30 (e.g., another of the seat cushions 23) that together form at least part of the seat backrest portion 20 of the seat assembly 10. Various other trim and/or shell panels or components 31 may be directly or indirectly coupled to the seat frame 22 to form any remaining parts or sections of the seat base portion 18 and/or the seat backrest portion 20 of the seat assembly 10.

As will be discussed in further detail below, the seat base and backrest cushions 28 and 30 are each formed of relatively flexible and/or soft materials such as a foam material(s) 34 that is covered or at least partially covered with an outer covering 36. The outer covering 36 is a relatively flexible and/or soft skin material such as leather, cloth or textile fabric (e.g., woven or knitted construction), thermoplastic skin material such as TPO, PVC, or the like. The outer covering 36 may be formed using a conventional leather forming process, a thermoforming process, a slush or rotational molding process, and/or any other conventional process for forming an interior trim outer skin covering that is relatively flexible and/or soft.

Referring to FIGS. 1-4, in an exemplary embodiment, the foam material(s) 34 in the seat base cushion 28 is configured as multiple modular pieces or modular foam sections 40, 42, 44, 46, 48, 50, 52, 54, and 56 that are coupled together to form a modular foam arrangement 38. As illustrated, the modular foam section 40 is an exterior modular foam section disposed along an outer-most portion of the modular foam arrangement 38 adjacent to and underlying the outer covering 36. The modular foam section 40 extends from a rearward section 66 of the seat base portion 18, which lies under the seat backrest portion 20, generally forward to a forward section 68 of the seat base portion 18. The modular foam section 40 has a down-standing flange 70 that wraps around the forward section 68 immediately adjacent to the outer covering 36. As such, the modular foam section 40 forms a portion of the modular foam arrangement 38 of the seat base cushion 28 that is disposed most proximate to a seat occupant.

The remaining modular foam sections 42, 44, 46, 48, 50, 52, 54, and 56 are interior modular foam sections that are disposed in the interior portion of the modular foam arrangement 38 underneath the modular foam section 40. As illustrated, the modular foam sections 42, 44, 46, 48, 50, and 56 are disposed immediately adjacent to the modular foam section 40 along a side opposite the outer covering 36, while the modular foam sections 52 and 54 are spaced apart from the modular foam section 40 in a further interior portion of the modular foam arrangement 38.

Figure 5:
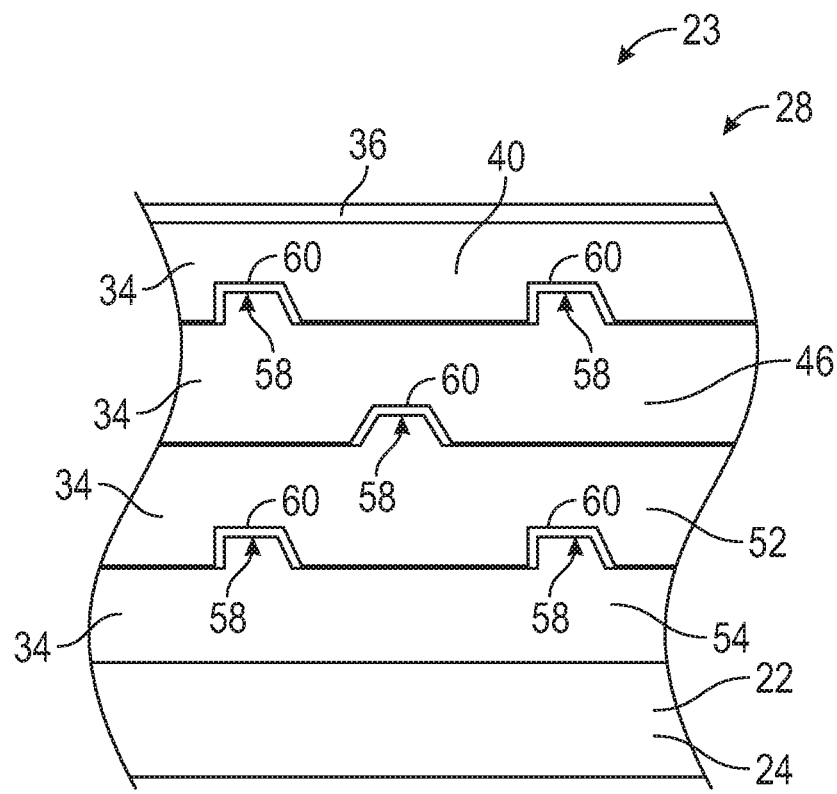
FIG. 5 illustrates a sectional view of a portion of a seat cushion in accordance with an exemplary embodiment.

Referring also to FIG. 5, at least some of the modular foam sections 40, 42, 44, 46, 50, 52, and 54 correspondingly have interlocking features 58 and 60 that engage the interlocking features 58 and 60 of one or more of the other adjacent modular foam sections 40, 42, 44, 46, 50, 52, and 54 for coupling the modular foam sections 40, 42, 44, 46, 50, 52, and 54 together. In an exemplary embodiment, the interlocking features 60 are negative features such as recesses or holes, and the interlocking features 58 are positive features such as projections or bosses that engage with the negative features. In one example, the interlocking features 58 can independently be configured as a boss having a substantially cylindrical-shape, and the interlocking features 60 can independently be configured as a hole having a substantially cylindrical shape for receiving and engaging the interlocking features 58. In another example, the interlocking features 58 can independently be configured as a boss having a substantially polygonal box-shape, and the interlocking features 60 can independently be configured as a hole having a substantially polygonal shape for receiving and engaging the interlocking features 58.

The modular foam sections 40, 42, 44, 46, 48, 50, 52, 54, and 56 may be formed from the same type of foam or different types of foam. For example, one or more of the modular foam sections 40, 42, 44, 46, 48, 50, 52, 54, and 56 may be formed from a thermoset type material (e.g., polyurethane or polyurea type foam material) based on conventional foam forming techniques of reacting two or more components, such as, for example, by reacting polyols with diisocyanates in the presence of a foaming agent. Alternatively, one or more of the modular foam sections may be formed from a thermoplastic material (e.g., polyolefin type foam) based on conventional foam forming techniques of foaming thermoplastic materials, such, as, for example, by saturating a thermoplastic material with liquid nitrogen and decompressing the liquid nitrogen saturated-thermoplastic material in an autoclave to form a thermoplastic foam.

The modular foam sections 40, 42, 44, 46, 48, 50, 52, 54, and 56 may be fabricated by initially forming one or more foam blocks using one or more conventional foam forming processes, such as those discussed above or by any other foam forming process known to those skilled in the art. In an exemplary embodiment, the one or more foam blocks are then cut, milled, and/or otherwise trimmed using a computer numerical control (CNC) process to form, for example, the intricate shapes that define the modular foam sections 40, 42, 44, 46, 48, 50, 52, 54, and 56 including the corresponding interlocking features 58 and 60.

The one or more of the modular foam sections 40, 42, 44, 46, 48, 50, 52, 54, and 56 may have a different foam density than one or more of the other modular foam sections 40, 42, 44, 46, 48, 50, 54, and 56. In an exemplary embodiment, the modular foam section 40, which is the exterior modular foam section, has a lower foam density and the remaining interior modular foam sections, specifically the modular foam sections 42, 44, 46, 48, 50, 52, 54, and 56. In an exemplary embodiment, the modular foam section 40 has a relatively ultralow foam density, the modular foam sections 42, 44, 46, and 56 have a relatively low foam density, the modular foam sections 48 and 50 have a relatively medium foam density, and the modular foam sections 52 and 54 have a relatively high foam density. As used herein, the terms "relatively ultralow foam density," "relatively low foam density," "relatively medium foam density," and "relatively high foam density" are relative terms for comparing the foam densities between the different modular foam sections 40, 42, 44, 46, 48, 50, 52, 54, and 56 of the modular foam arrangement 38. In an exemplary embodiment, the relative foam density of a particular modular foam section 40, 42, 44, 46, 48, 50, 52, 54, and 56 corresponds to its relative softness/hardness. That is, the modular foam section 40 having a relatively ultralow foam density is softer or less hard than the other modular foam sections 42, 44, 46, 48, 50, 52, 54, and 56. Likewise, the modular foam sections 42, 44, 46, and 56 are softer or less hard than the modular foam sections 48 and 50, which are softer or less hard than the modular foam sections 52 and 54.

In an exemplary embodiment, the modular foam section 48 which is an interior modular foam section that is disposed in the rearward section 66 of the seat base portion 18 beneath the seat backrest portion 20, is affixed to the adjacent modular foam sections 40, 46, 52, and 54 with an adhesive 72. As illustrated, no adhesive or substantially no adhesive (e.g., substantially free of adhesive) is present between the interfaces 74, 76, 80, 82, and 84 between the adjacent modular foam sections 40, 42, 44, 46, 50, and 54, thereby reducing the amount of adhesive used in the modular foam arrangement 38 as compared to conventional seat cushions.

Referring to FIG. 2, the foam material(s) 34 in the seat backrest cushion 30 may be configured with multiple modular pieces or modular foam sections with interlocking features, or alternatively, may be formed of a single piece of foam or multiple pieces of foam that are affixed together with an adhesive. In an exemplary embodiment, the seat backrest cushion 30 includes a modular foam arrangement similar configured to the modular foam arrangement 38 as discussed above in relation to the seat base cushion 28.

Figure 6:
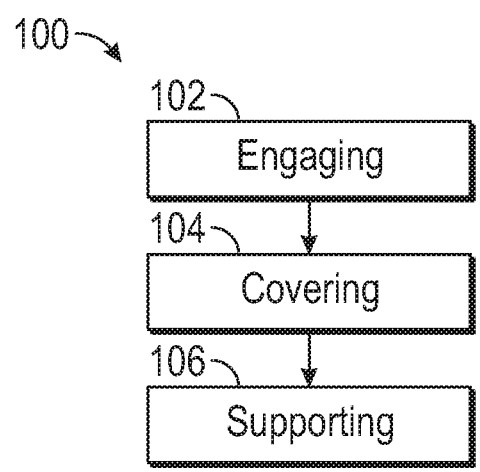
FIG. 6 illustrates a method for fabricating a seat assembly in accordance with an exemplary embodiment.

Referring to FIG. 6, a method 100 for fabricating a seat assembly is provided. The method 100 includes engaging (STEP 102) a first interlocking feature of a first modular foam section with a second interlocking feature of a second modular foam section for forming a modular foam arrangement. In one example, the first interlocking feature is a negative feature and the second interlocking feature is a positive feature that is flexed or otherwise manipulated during assembly to become engaged with the negative feature. The modular foam arrangement is at least partially covered (STEP 104) with an outer covering for forming a seat cushion. The seat cushion is supported (STEP 106) by a seat frame.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A seat assembly comprising:
a seat frame; and
a seat cushion supported by the seat frame and comprising:
a modular foam arrangement comprising a first modular foam section having a first interlocking feature and a second modular foam section having a second interlocking feature engaged with the first interlocking feature, wherein the second modular foam section is disposed adjacent to the first modular foam section along an interface, and wherein the interface is free of any adhesive and is defined by corresponding unbonded trimmed surfaces of the first and second modular foam sections that are in direct contact with each other; and
an outer covering that at least partially covers the modular foam arrangement.

2. The seat assembly of claim 1, wherein the seat cushion is a seat base cushion.

3. The seat assembly of claim 1, wherein the seat cushion is a seat backrest cushion.

4. The seat assembly of claim 1, wherein the first interlocking feature is a negative feature and the second interlocking feature is a positive feature that engages with the negative feature.

5. The seat assembly of claim 4, wherein the negative feature is a recess and the positive feature is a projection.

6. The seat assembly of claim 5, wherein the projection is a boss having one of a substantially cylindrical-shape and a substantially polygonal box-shape.

7. The seat assembly of claim 5, wherein the recess has one of a substantially cylindrical hole-shape and a substantially polygonal hole-shape.

8. The seat assembly of claim 1, wherein the first modular foam section is an exterior modular foam section that is disposed adjacent to the outer covering and the second modular foam section is an interior modular foam section that is disposed adjacent to the first modular foam section on a side opposite the outer covering.

9. The seat assembly of claim 8, wherein the exterior modular foam section has a first foam density and the interior modular foam section has a second foam density that is different than the first foam density.

10. The seat assembly of claim 9, wherein the first foam density is less than the second foam density.

11. The seat assembly of claim 1, wherein the modular foam arrangement further comprises a third modular foam section that is disposed in a rearward section of the modular foam arrangement and an adhesive that affixes the third modular foam section to at least one of the first modular foam section and the second modular foam section that are disposed forward of the third modular foam section.

12. The seat assembly of claim 1, wherein the modular foam arrangement is free of any adhesive.

13. A seat assembly comprising:
a seat base portion comprising a seat base structure portion and a seat base cushion supported by the seat base structure portion, wherein the seat base cushion comprises:
   a modular foam arrangement comprising a first modular foam section having a first interlocking feature and a second modular foam section having a second interlocking feature engaged with the first interlocking feature, wherein the second modular foam section is disposed adjacent to the first modular foam section along an interface, and wherein the interface is free of any adhesive and is defined by corresponding unbonded trimmed surfaces of the first and second modular foam sections that are in direct contact with each other; and
   an outer covering that at least partially covers the modular foam arrangement; and wherein the seat assembly further comprises:
a seat backrest portion coupled to the seat base portion and configured to extend substantially upright from a rearward section of the seat base portion, and wherein the first modular foam section overlies the second modular foam section and extends generally forward of the seat backrest portion.

14. The seat assembly of claim 13, wherein the first modular foam section is an exterior modular foam section that is disposed adjacent to the outer covering and the second modular foam section is an interior modular foam section that is disposed adjacent to the first modular foam section on a side opposite the outer covering.

15. The seat assembly of claim 14, wherein the exterior modular foam section has a first foam density and the interior modular foam section has a second foam density that is different than the first foam density.

16. The seat assembly of claim 15, wherein the first foam density is less than the second foam density.

17. The seat assembly of claim 13, wherein the modular foam arrangement further comprises a third modular foam section that is disposed in the rearward section of the seat base portion beneath the seat backrest portion.

18. The seat assembly of claim 13, wherein sections of the modular foam arrangement that are disposed forward of the seat backrest portion are free of any adhesive.

19. A method for fabricating a seat assembly, the method comprising the steps of:
   engaging a first interlocking feature of a first modular foam section with a second interlocking feature of a second modular foam section for forming a modular foam arrangement, wherein the second modular foam section is disposed adjacent to the first modular foam section along an interface, and wherein the interface is free of any adhesive and is defined by corresponding unbonded trimmed surfaces of the first and second modular foam sections that are in direct contact with each other;
   at least partially covering the modular foam arrangement with an outer covering for forming a seat cushion; and
   supporting the seat cushion by a seat frame.

20. The method of claim 19, further comprising the step of forming at least one of the first modular foam section and the second modular foam section using a computer numerical control (CNC) process prior to the step of engaging the first and second interlocking features.

* * * * *